United States Patent
Reed, Jr.

(10) Patent No.: US 10,422,128 B2
(45) Date of Patent: *Sep. 24, 2019

(54) INSULATION SYSTEM AND METHOD FOR BUILDINGS

(71) Applicant: Southern AG Builders & Supply, LLC, Biscoe, NC (US)

(72) Inventor: Clifford Paul Reed, Jr., Jackson Springs, NC (US)

(73) Assignee: Southern Ag Builders & Supply, LLC, Biscoe, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,667

(22) Filed: Apr. 18, 2019

(65) Prior Publication Data
US 2019/0242119 A1 Aug. 8, 2019

Related U.S. Application Data

(62) Division of application No. 15/463,002, filed on Mar. 20, 2017, now Pat. No. 10,280,613.

(60) Provisional application No. 62/312,037, filed on Mar. 23, 2016.

(51) Int. Cl.
| | |
|---|---|
| *E04B 1/76* | (2006.01) |
| *A01K 31/22* | (2006.01) |
| *E04D 13/16* | (2006.01) |
| *A01K 1/00* | (2006.01) |
| *A01K 31/18* | (2006.01) |
| *E04C 3/02* | (2006.01) |
| *E04B 9/00* | (2006.01) |

(52) U.S. Cl.
CPC .............. *E04B 1/7658* (2013.01); *A01K 1/00* (2013.01); *A01K 31/18* (2013.01); *A01K 31/22* (2013.01); *E04B 1/7675* (2013.01); *E04C 3/02* (2013.01); *E04D 13/1668* (2013.01); *E04B 9/001* (2013.01)

(58) Field of Classification Search
CPC .......... A01K 1/00; A01K 31/18; A01K 31/22; E04B 1/7658; E04B 1/7675; E04B 9/001; E04C 3/02; E04D 13/1668
See application file for complete search history.

(56) References Cited

U.S. PATENT DOCUMENTS

| | | | | | |
|---|---|---|---|---|---|
| 1,745,588 | A | * | 2/1930 | Shodron | ............... E04B 1/3205 |
| | | | | | 119/436 |
| 2,989,790 | A | * | 6/1961 | Brown | ................... E04B 1/7604 |
| | | | | | 52/742.13 |
| 4,047,346 | A | * | 9/1977 | Alderman | ........... E04D 13/1625 |
| | | | | | 52/127.5 |
| 4,134,242 | A | * | 1/1979 | Musz | .................... E04F 21/085 |
| | | | | | 252/62 |
| 4,385,477 | A | * | 5/1983 | Walls | .................... E04B 1/7604 |
| | | | | | 52/220.1 |

(Continued)

*Primary Examiner* — James M Ference
(74) *Attorney, Agent, or Firm* — Olive & Olive, P.A.

(57) ABSTRACT

An apparatus, method and system of insulating a building such as a poultry barn uses netting structurally of the type to hold sod together. The netting is stapled to the bottom of trusses making up the ceiling of a barn and the attic of the barn. Ceiling material is superimposed below the netting to form a ceiling. Loose insulation, typically fiberglass, is blown onto the netting to be held thereby and to form an insulation layer in the attic of the barn.

8 Claims, 2 Drawing Sheets

(56) References Cited

U.S. PATENT DOCUMENTS

| | | | | |
|---|---|---|---|---|
| 4,516,363 A * | 5/1985 | Beaulieu | E04C 3/17 | 52/198 |
| 4,565,037 A * | 1/1986 | DeSchane | E04D 13/178 | 454/260 |
| 4,635,423 A * | 1/1987 | Ward | E04B 1/642 | 156/71 |
| 4,696,138 A * | 9/1987 | Bullock | E04B 1/7604 | 52/268 |
| 4,707,960 A * | 11/1987 | Bullock | E04B 1/7604 | 52/22 |
| 4,712,347 A * | 12/1987 | Sperber | E04B 1/7604 | 52/404.1 |
| 4,724,651 A * | 2/1988 | Fligg | E04B 1/7604 | 52/407.3 |
| 4,875,320 A * | 10/1989 | Sparkes | E04B 9/001 | 52/406.1 |
| 4,885,886 A * | 12/1989 | Rosso | E04B 1/7658 | 52/404.3 |
| 5,287,674 A * | 2/1994 | Sperber | E04B 1/7604 | 52/404.1 |
| 5,365,716 A * | 11/1994 | Munson | E04B 1/7604 | 52/404.1 |
| 5,367,849 A * | 11/1994 | Bullock | E04B 9/001 | 52/409 |
| 5,421,133 A * | 6/1995 | Berdan, II | E04B 1/767 | 156/71 |
| 5,697,198 A * | 12/1997 | Ponder | E04B 1/7604 | 52/404.1 |
| 5,819,496 A * | 10/1998 | Sperber | E04B 1/7604 | 52/742.13 |
| 6,204,207 B1 * | 3/2001 | Cederblad | B32B 5/12 | 442/5 |
| 6,262,164 B1 * | 7/2001 | Church | B05B 7/1409 | 106/711 |
| 6,349,518 B1 * | 2/2002 | Chacko | E04D 13/1612 | 52/404.1 |
| 6,401,426 B1 * | 6/2002 | Alderman | E04D 13/1625 | 52/745.06 |
| 6,444,286 B1 * | 9/2002 | MacKenzie | B32B 15/12 | 428/114 |
| 6,584,749 B2 * | 7/2003 | Sperber | E04B 1/7604 | 52/404.1 |
| 6,694,693 B2 * | 2/2004 | Alderman | E04D 13/1618 | 52/404.3 |
| 7,513,085 B2 * | 4/2009 | Moody | E04B 9/00 | 52/635 |
| 7,594,618 B2 * | 9/2009 | Fellinger | E04B 1/7604 | 241/189.1 |
| 7,654,051 B2 * | 2/2010 | Pollack | E04B 1/74 | 52/302.1 |
| 7,861,467 B2 * | 1/2011 | Rosten | E04D 13/178 | 52/198 |
| 8,176,699 B1 * | 5/2012 | Birchfield | E04B 7/022 | 52/406.2 |
| 8,322,111 B2 * | 12/2012 | Near | E04B 9/001 | 52/741.4 |
| 8,347,562 B2 * | 1/2013 | Morris | E04D 13/1631 | 428/163 |
| 8,782,982 B2 * | 7/2014 | Lewis | E04B 1/7654 | 52/407.3 |
| 8,850,752 B1 * | 10/2014 | Graboski | E04D 13/172 | 52/95 |
| 2003/0061777 A1 * | 4/2003 | Alderman | E04B 9/045 | 52/407.3 |
| 2004/0000113 A1 * | 1/2004 | Alderman | B32B 5/02 | 52/407.5 |
| 2004/0250490 A1 * | 12/2004 | Hall | E04B 1/7654 | 52/506.01 |
| 2006/0117686 A1 * | 6/2006 | Mankell | E04D 13/1625 | 52/302.1 |
| 2006/0123724 A1 * | 6/2006 | Pollack | E04B 1/7662 | 52/302.1 |
| 2006/0166581 A1 * | 7/2006 | Huang | D04B 1/02 | 442/181 |
| 2006/0236639 A1 * | 10/2006 | Toas | E04B 1/767 | 52/406.2 |
| 2008/0202041 A1 * | 8/2008 | Dillon | E04D 13/152 | 52/95 |
| 2008/0202443 A1 * | 8/2008 | Potter | A01K 31/22 | 119/437 |
| 2009/0044797 A1 * | 2/2009 | Klement | E04D 13/178 | 126/621 |
| 2010/0024325 A1 * | 2/2010 | Robbins | E04D 12/002 | 52/173.1 |
| 2011/0036034 A1 * | 2/2011 | Robinson | E04B 1/7666 | 52/404.3 |
| 2012/0048205 A1 * | 3/2012 | Sia | A01K 31/00 | 119/437 |
| 2013/0139762 A1 * | 6/2013 | Loden | A01K 1/00 | 119/416 |
| 2013/0280467 A1 * | 10/2013 | Fay | E04B 1/62 | 428/68 |
| 2014/0013688 A1 * | 1/2014 | Pollack | D04H 1/4266 | 52/302.1 |
| 2014/0311070 A1 * | 10/2014 | Pollack | E04D 13/172 | 52/302.1 |
| 2015/0218802 A1 * | 8/2015 | Wolf | E04D 13/1637 | 52/404.3 |
| 2015/0218803 A1 * | 8/2015 | Rockwell | E04D 13/1637 | 52/404.2 |
| 2015/0233110 A1 * | 8/2015 | Alter | E04B 1/7658 | 52/404.2 |
| 2015/0259907 A1 * | 9/2015 | Points | E04B 7/024 | 52/653.1 |
| 2015/0259908 A1 * | 9/2015 | Pendley | E04G 21/3261 | 52/745.06 |
| 2015/0259933 A1 * | 9/2015 | Pendley | E04G 21/3261 | 182/137 |
| 2015/0259934 A1 * | 9/2015 | McLain | E04G 21/3261 | 182/137 |
| 2015/0259935 A1 * | 9/2015 | McLain | E04B 7/024 | 52/94 |
| 2016/0024799 A1 * | 1/2016 | Pollack | E04D 13/172 | 52/302.1 |
| 2017/0275869 A1 * | 9/2017 | Reed, Jr. | E04B 1/7658 | |

* cited by examiner

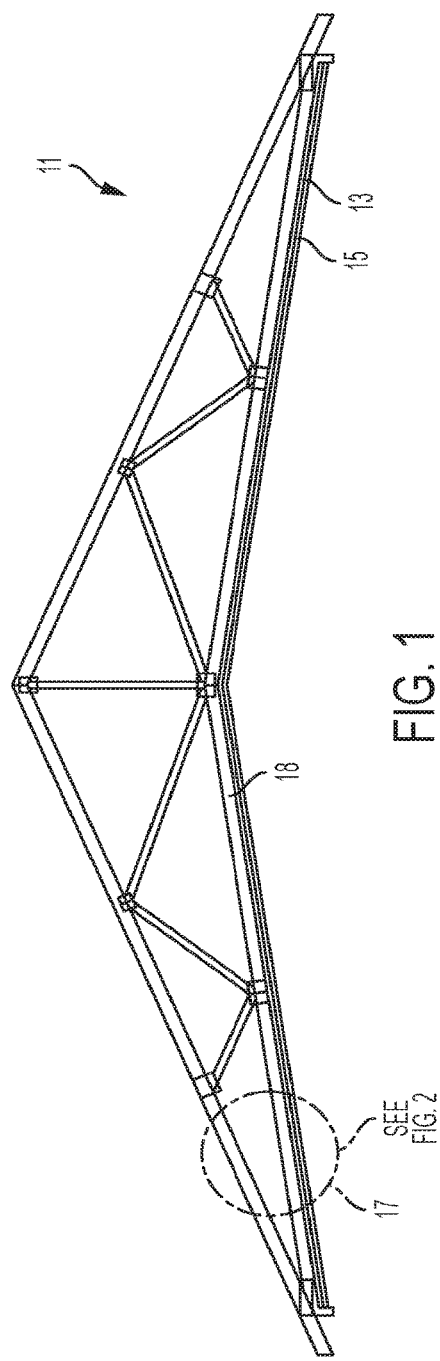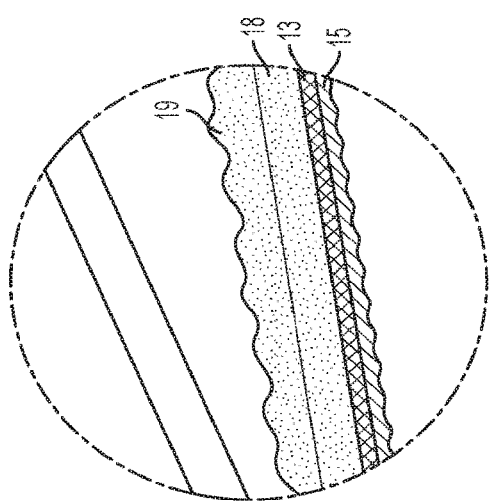

INSULATION SYSTEM AND METHOD FOR BUILDINGS

CROSS-REFERENCE TO RELATED APPLICATIONS

This application is a divisional application of application Ser. No. 15/463,002, entitled INSULATION SYSTEM AND METHOD FOR BUILDINGS, filed Mar. 20, 2017, and claims priority thereto. This application is also related to and claims priority to Provisional Application Ser. No. 62/312,037 filed Mar. 23, 2016 of the same inventor herein entitled INSULATION SYSTEM AND METHOD FOR POULTRY BARNS. The disclosures of application Ser. No. 15/463,002 and of Provisional Application Ser. No. 62/312,037 are is, incorporated in their entirety by reference therein.

BACKGROUND OF THE INVENTION

1. Field of Invention

This invention relates to an apparatus, system and method for providing insulation in the attic of a building such as a poultry barn. More specifically, the invention relates to such an apparatus, system and method in which insulation such as fiberglass wool insulation is blown into a truss space in the attic above a ceiling of the poultry barn. Netting is provided underneath the insulation to prevent it from migrating from the location it is first deposited, thus ensuring no open areas occur in the insulation due to migration of insulation, and thereby maintaining a full insulative effect.

2. Discussion of Prior Art

Attempts to provide insulation in the attic space of poultry barns have involved many different techniques. One technique involves the use of cellulosic material which is sprayed in an attic throughout the top of the ceiling of the poultry barn, i.e., the side open to the attic. The cellulosic materials are spray mixed with an adhesive material to ensure that the cellulosic material adheres to the side of the ceiling facing the attic, and does not migrate and leave areas on the top surface of the ceiling, i.e., the surface facing the attic, exposed without insulation. A problem with such a system however, is that cellulosic material is not of high insulative quality. In addition, the use of the adhesive material creates a messy environment as the cellulosic material is being laid down as insulation. Further, over time the cellulosic material breaks down over time.

One attempt to improve on a system using cellulosic material involves the use of fiberglass insulation which is blown into the attic space. Fiberglass insulation is preferable over cellulosic materials because it does not breakdown and compact over time as compared to the cellulosic materials. However, in order to have the insulation stay in place it also requires blowing it mixed with an adhesive. In the case of fiberglass, one typical adhesive used is starch, mixed in with the blown fiberglass, and water to ensure the fiberglass adheres together, and does not migrate in the attic space on the upper surface of, for example, ceiling paper making up the ceiling. In addition, the use of water reduces the insulative coverage by at least thirty percent (30%), as compared to insulation blown into the attic without water.

In accordance with the invention, the problems of the prior art apparatus, systems and methods are avoided by providing a simple insulative apparatus, system and method which does not require adhesive, while still deploying blown fiberglass which is retained in place by a mesh netting arrangement which grips the insulation and holds it in place.

BRIEF SUMMARY

In accordance with the invention, an improvement is provided eliminating the need for water and an adhesive such as starch. When a building such as a poultry barn is being constructed, mesh netting is stapled to the bottom of trusses making up the support for the ceiling of a building and the bottom surface of the attic space of the building, e.g., a poultry barn. Ceiling material is then superimposed on the netting facing the interior space of the poultry barn and fiberglass is then blown onto the netting on which it is retained in place in the attic by having the netting grip the insulation and hold it, and keep it from sliding.

More specifically, in one aspect the invention is a method for placing loose insulation in an attic of a building. Mesh netting is attached to the bottom of trusses making up the bottom of an attic space of the building. Ceiling material is installed below the mesh netting to form the ceiling of the interior space of the building. Loose insulation is blown onto the mesh netting which faces the attic space to hold the insulation through interaction with the mesh netting to prevent migration of the insulation over time without a need for adhesive material being mixed with the insulation.

In another aspect, an apparatus or system is provided for insulating a building by providing insulation in an attic of the building. Mesh netting is attached to the bottom of trusses making up the bottom surface of a building such as a poultry barn. Ceiling material is installed below the mesh netting, also attached to the trusses to which the netting is attached. Loose insulation is distributed over the netting within the attic to a depth required for the insulation value desired.

BRIEF DESCRIPTION OF THE DRAWINGS

Having thus briefly described the invention, the same will become better understood from the following detailed description made with reference to the drawings wherein:

FIG. 1 is a cross-sectional view of a standard poultry barn or house truss with a pitched roof line;

FIG. 2 is an enlarged view of a portion of a poultry barn truss showing the arrangement of blown insulation, netting and ceiling material in assembled form.

DETAILED DESCRIPTION OF EMBODIMENTS

Figure 3:
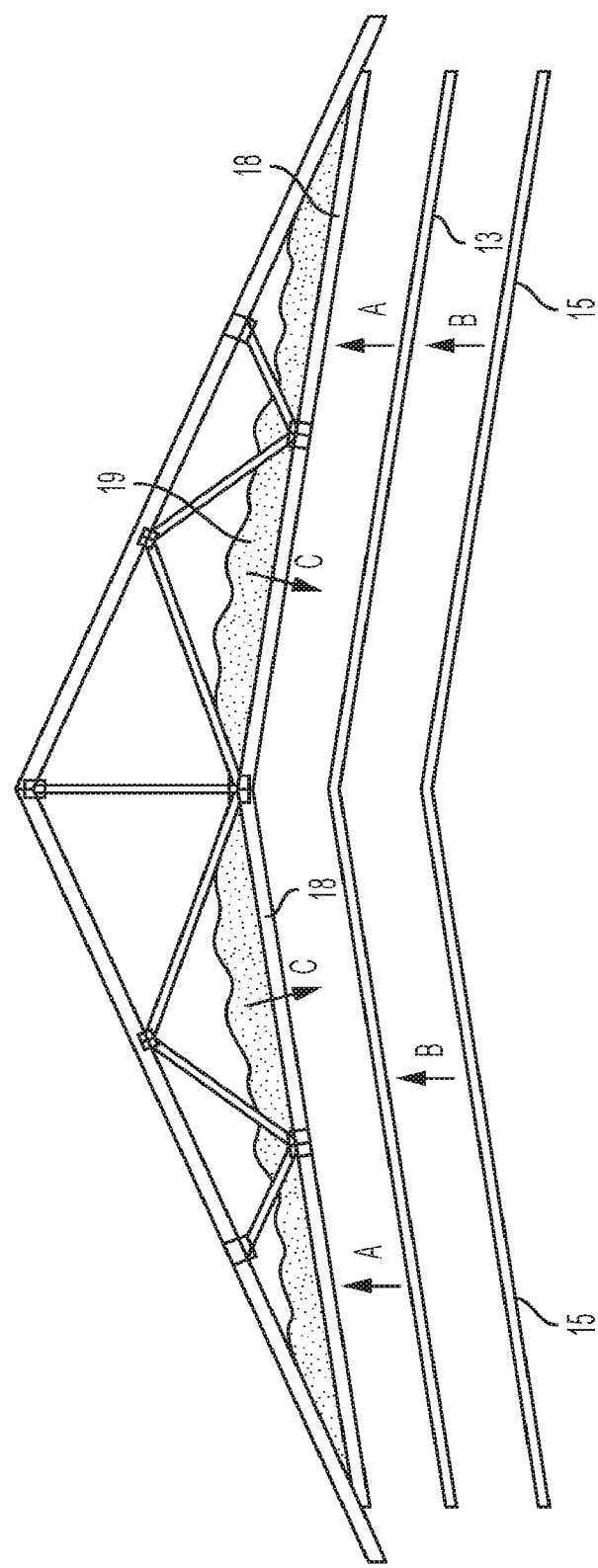
FIG. 3 is an exploded view of the structure of FIG. 1 showing the arrangement of insulation, netting and ceiling material in relationship to trusses of the attic.

In accordance with the invention an improved apparatus, method and system of providing insulation in a building attic, such as a poultry barn attic is provided.

The system of the invention involves the use of netting of the type which is similar to that which is used, for example, as a sod matrix to hold sod together. The type of netting used in sod is however biodegradable which is not desirable. By using conventional manufacturing techniques, a similarly structured netting can be manufactured to be non-biodegradable so it maintains its structure when used in the system of the invention, and is preferred for such use.

In accordance with the invention the size of the mesh in the netting has some significance, but is not critical and can be of a variety of different sizes so long as it is sufficient to hold the insulation, which is blown onto the netting in place over time.

Thus, as shown in FIG. 1, a truss structure 11 of a building such as a standard poultry barn is constructed and is pitched in a manner well known to those of ordinary skill in the art. As the poultry barn is constructed, mesh netting 13 is stapled to the bottom of the trusses 18 making up the lower part of the attic truss structure 11 facing the building's interior space. Thereafter, ceiling material such as triple ply woven ceiling material 15 is typically stapled below the netting 13 as shown in FIG. 2, to form the ceiling for the structure.

As further illustrated in the enlarged portion 17 shown in greater detail in FIG. 2, once the netting 13 and the ceiling material 15 are assembled together to form the lower portion of the attic and the ceiling of the structure, fiberglass insulation 19 is blown from the top onto the netting 13 within the attic and is retained thereon in a stable manner with little or no migration of insulation.

FIG. 3 shows the system of the invention in which the fiberglass insulation 19, the mesh netting 13, and the ceiling paper 15 are shown in exploded form. The mesh netting 13 is first attached to truss 18 by being moved in the direction of arrow A. The ceiling paper 15 is then attached to the truss 18 by being moved in the direction of arrow B. The insulation 19 is then blown from above in the direction of arrow C onto the mesh netting 13 between the trusses 18.

By way of further explanation, the netting used in the invention, which is typically similar in structure to that used to hold sod together, but in this case preferably being non-biodegradable to ensure longevity, is fastened securely but loosely to the underside of trusses or rafters with approximately ten percent (10%) overage of netting to achieve mild sagging or bagging. Thus, for example, for every one thousand (1,000) square feet covered one would need one thousand one hundred (1,100) square feet of netting. Standard ceiling material required for the project is then installed under the netting so that the netting is exposed toward the attic area. A required thickness of standard fiberglass blowing wool is then blown over the netting to be deposited therein in a manner in which it does not migrate.

The netting should be of a size in which enough netting is provided to adequately go from front to back of a house or building in one piece with overlapping two (2) to three (3) inches from side to side of width of the house or building until the entire ceiling or what is to be the ceiling for the attic is covered. To install the netting, the installer starts at the peak and works their way towards the side walls and if there is a lap at the peak, a twelve (12) inch or thereabouts overlap is provided. Typically, for every four (4) feet from peak or center down the remainder of the structure, the netting should be lapped back onto itself to create migration cavities. The netting should be fastened about every twenty four (24) inches to the bottom of trusses. Thus, fastening to every other truss should be sufficient in most structures. The ceiling material is then installed under the netting in a normal and conventional manner, and the fastening of the ceiling material will also further secure the netting in place. When the blowing wool is installed, it should be installed carefully, since it is not going to slide as it normally does without the presence of the netting.

The following is a specification sheet of a typical type netting which can be used in implementing the invention.

| Item | Specified Value | Test Method |
|---|---|---|
| Average Weight (lb/1000 sq ft) | 1.45 +/− 0.15 PMSF | Modified ASTM D3776 |
| Average Strand Count (strands/10") | Strand Count 13.2 +/− 2 per 10" MD 7.0 +/− 0.5 per 10" TD* | Modified ASTM D3775 |
| Average Tensile Strength (lb/3") or (lb/#strands in 3") | Tensile Strength MD = 17.0 +/− 4.0 lb/4 strands TD = 9.0 +/− 2.5 lb/2 strands | Modified ASTM 1682 |
| Color | N/A (Natural) | |
| Resin | PP | |
| Manufactured Length | Target 20000' | |
| Packaging | Sleeve wrap with poly. 6" ID poly core Core length 105" Core tag and roll tag Wrapped in blue poly wrap. | |
| Roll Width | Minimum width 102" | |
| Splices | 3 max. Single sew, sandwich tape edges. | |
| Roll weight | 280 +/− 28.0 lbs. | |
| Roll Diameter | 18" +/− 2" | |

Having thus generally described the invention, the same will become better understood from the following claims in which it is set forth in a non-limiting manner.

What is claimed is:

1. An apparatus for providing insulation in an attic of a building having a plurality of trusses with bottom surfaces making up a bottom surface of the attic of the building, comprising:
   mesh netting attached to the bottom surfaces of the plurality of trusses making up the bottom surface of an the attic of the building;
   ceiling material installed below the mesh netting, the ceiling material comprising a woven ceiling material, and further comprising the woven ceiling material stapled to the plurality of trusses to which the mesh netting is attached; and
   loose blown insulation distributed uniformly over the mesh netting within the attic of the building to a depth required for an insulation value desired, said mesh netting having openings sufficiently small to prevent the loose blown insulation from passing through the mesh netting and capturing the loose insulation to prevent the loose insulation from migrating.

2. The apparatus of claim 1, wherein said loose blown insulation comprises fiberglass wool.

3. The apparatus of claim 1, wherein said mesh netting has a strand count which comprises:
   13.2+/−2 per 10" MD,
   7.0+/−0.5 per 10" TD.

4. The apparatus of claim 1, wherein said building comprises a poultry barn.

5. The apparatus of claim 1, wherein said mesh netting is stapled to the plurality of trusses in a manner that said loose blown insulation is retained thereon while allowing the installed ceiling material to function as a ceiling.

6. The apparatus of claim 1, wherein said mesh netting is non-biodegradable.

7. The apparatus of claim 6, wherein about 10 percent of mesh netting overage is provided to achieve controlled sagging of the mesh netting when stapled to the plurality of trusses.

8. The apparatus of claim 7, wherein when said ceiling material is installed, the mesh netting is exposed to the attic of the building.

* * * * *